United States Patent [19]

Browning

[11] 4,127,038
[45] Nov. 28, 1978

[54] SPROCKET SHIFT ASSEMBLY

[75] Inventor: Bruce W. Browning, Bainbridge Island, Wash.

[73] Assignees: David L. Browning; Marc S. Browning; Christopher M. Browning, all of Bainbridge Island, Wash.; John B. Browning, Sun Valley, Id.; Gloria S. Browning, Sun Valley, Id.; Michael C. Browning, Sun Valley, Id.; Paul C. Browning, Sun Valley, Id.

[21] Appl. No.: 712,246

[22] Filed: Aug. 6, 1976

[51] Int. Cl.² .................. F16H 11/00; F16H 55/30; F16H 55/52; B62M 9/12

[52] U.S. Cl. ................................. 74/217 B; 74/244; 280/236

[58] Field of Search ............... 74/217 R, 217 B, 244, 74/230.18, 439, 448; 280/236, 237, 238

[56] References Cited

U.S. PATENT DOCUMENTS 3,769,848  11/1973  McGuire .......................... 74/217 B
3,938,403   2/1976  Donaldson ........................ 74/244

Primary Examiner—Benjamin W. Wyche
Assistant Examiner—W. R. Henderson
Attorney, Agent, or Firm—B. Deon Criddle

[57] ABSTRACT

A sprocket shift assembly wherein sprockets of different diameters are arranged as a cluster on a common shaft and are coupled with a chain between driving and driven members. The chain is movable as the sprockets rotate from one of the sprockets to another by realignment of portions of the sprocket such that the chain is at all times in a positive driving relationship with the cluster.

30 Claims, 15 Drawing Figures

SPROCKET SHIFT ASSEMBLY

BRIEF DESCRIPTION OF THE INVENTION

1. Field of the Invention

This invention relates to mechanisms for transferring force through a chain and sprocket and particularly to such mechanisms wherein drive ratios are changed by moving the chain between sprockets of different diameters during rotation of the sprockets.

2. Prior Art

The advantages of and need for variable speed chain and sprocket assemblies has long been recognized. U.S. Pat. Nos. 3,448,628 and 3,583,249 show derailleur mechanisms of the type commonly found on bicycles for the purpose of shifting a driving chain from sprocket to sprocket in a cluster of sprockets having different diameters, for example. Other devices, such as those shown in U.S. Pat. Nos. 3,798,989, 3,861,227 and 3,800,613 show mechanisms wherein the effective diameter of a compound sprocket is varied to achieve different speed ratios.

While these previously known devices may be satisfactory for many purposes, they do not provide an effective and positive drive unit with a chain between driving and driven members, where a positive drive relationship is maintained between sprocket and chain during shifting operations of the chain from sprocket to sprocket and where an effective sprocket diameter is continuously maintained during driving operations, regardless of the torque applied thereto or the speed of operation.

SUMMARY OF THE INVENTION

A principal object of the present invention is to provide a sprocket shift assembly wherein a chain can be moved from sprocket to sprocket of a cluster of sprockets, without losing a positive drive connection during such shifting.

Other objects are to provide a sprocket shift assembly that is easily operated and that can be readily made responsive to various shifting conditions, and to provide such an assembly that is made up of a minimum number of readily assembled and easily produced parts.

Principal features of the invention include a driving hinge that may be of different configurations but that is adapted to fit on or to be part of a rotating member and that is to allow for continuous driving inter-engagement between the hinge and sprocket sectors that are pivotally connected thereto. The sprocket sectors may each include one or more partial sprockets so that when the sprocket sectors are fully engaged with the driving hinge the cooperating partial sprockets on the sprocket sectors are aligned to provide separate full sprockets each lying in separate but parallel planes. When a sprocket sector is fully pivoted outwardly from the backing plate a driving inter-engagement between the driving hinge and the pivoted sprocket sector is maintained, but sprocket teeth of each partial sprocket of the pivoted sector are shifted to be in a sprocket plane that is adjacent to the plane in which the teeth are positioned when the sprocket sector is fully engaged with the backing plate.

Each sprocket sector can be pivoted, either while the chain is fully in mesh with a partial sprocket thereon or while the chain is fully in mesh with the partial sprocket of the other non-pivoted sprocket sector. Thus, as the chain is rotated it will move from a full sprocket of the sprocket assembly to a partial sprocket of the pivoted sprocket sector, from a partial sprocket of one size on a sprocket sector to a partial sprocket of another size on the other sprocket sector, or from a partial sprocket of one size on a pivoted sprocket sector to a full sprocket of different size. After the chain has moved to or from meshing engagement with one sprocket sector and onto or from another sprocket sector or full sprocket, the pivoted sprocket sector is biased back into full engagement with the driving hinge and is aligned with the other sprocket sector such that the partial sprockets of the sprocket sectors are aligned to make one or more full sprockets on which the chain can travel.

Means are provided to prevent untimely pivoting of the sprocket sectors and, if desired, a full, non-segmented sprocket can be used as the smallest sprocket of a sprocket cluster made up of the partial sprockets of each sprocket sector and the non-segmented sprocket. When only one segmented sprocket is used the non-segmented sprocket can be seen as lying in a second plane outward of the plane containing the segmented sprocket. When two segmented sprockets are used the non-segmented sprocket can be seen as lying in a third plane outward of a first and second plane containing the two segmented sprockets. When such a small non-segmented sprocket is used, however, the partial sprockets having teeth thereon that are to be moved into the same plane as the teeth of the non-segmented sprocket must be shaped to allow the teeth to be so arranged.

Another feature of the invention is that as the chain is moved from one segmented or non-segmented full sprocket of one size to a sprocket of another size the chain is transferred positively and smoothly in a generally helical pattern.

Still another feature of the invention is that with the chain traveling in a given direction, the pivoting of one sprocket sector will result in movement of the chain from a smaller full sprocket to another larger full sprocket, whereas pivoting of the other sprocket sector will result in movement of the chain from a larger full sprocket to a smaller full sprocket.

Yet another feature is that the pitch or tooth spacing, between sprocket portions around which the chain is passed, is maintained, even as the chain is moved between different sized sprocket portions. This is accomplished by using correspondingly symmetrical sprockets or by varying the depth of the gap between teeth and the size of transfer teeth on the partial sprockets to provide multiples of the chain pitch as the distance between discharging and receiving teeth of the sprockets.

Other objects and features of the invention will become apparent from the following detailed description and claims, taken together with the accompanying drawings.

THE DRAWINGS

In the drawings:

FIG. 1 is a side elevation view of a chain, passing around a sprocket cluster embodying the sprocket shift assembly of the invention and another sprocket;

FIG. 2, a top plan view, showing a supporting framework for the structure of FIG. 1;

FIG. 3, an exploded perspective view of the components of the sprocket cluster;

FIG. 4, a side elevation view showing the chain on a medium composite sprocket of the sprocket cluster and with all support structure removed for clarity;

FIG. 4a, an end elevation view of the sprocket cluster of FIG. 4;

FIG. 5, a view like FIG. 4, but showing the chain moving from a medium partial sprocket on one sprocket sector to a large partial sprocket on the other sprocket sector and with the pivoted sprocket sector shown shaded for clarity;

FIG. 5a, a view like that of FIG. 4a, but showing the sprocket cluster as positioned in FIG. 5;

FIG. 6, a view like that of FIG. 5, but showing the chain moving from a medium partial sprocket on one sprocket sector to a small sprocket of the sprocket cluster;

FIG. 6a, a view like that of FIG. 5a, but showing the sprocket cluster as positioned in FIG. 6;

FIG. 7, a view like that of FIG. 5, but showing the chain moving from the small sprocket of the sprocket cluster to a medium partial sprocket;

FIG. 7a, a view like that of FIG. 5a, but showing the sprocket cluster as positioned in FIG. 7;

FIG. 8, is a view like that of FIG. 5, but showing the chain moving from a large partial sprocket of one sprocket sector down to a medium partial sprocket of another sprocket sector;

FIG. 8a, a view like that of FIG. 5a, but showing the sprocket cluster as positioned in FIG. 8;

FIG. 9, an enlarged vertical section, taken on the line 9—9 of FIG. 8; and

FIG. 10, a still further enlarged, fragmentary perspective view, taken from above and looking generally along the line 10—10 of FIG. 9, and with the back plate partially broken away to show a sprocket sector latch.

DETAILED DESCRIPTION

Figure 1:
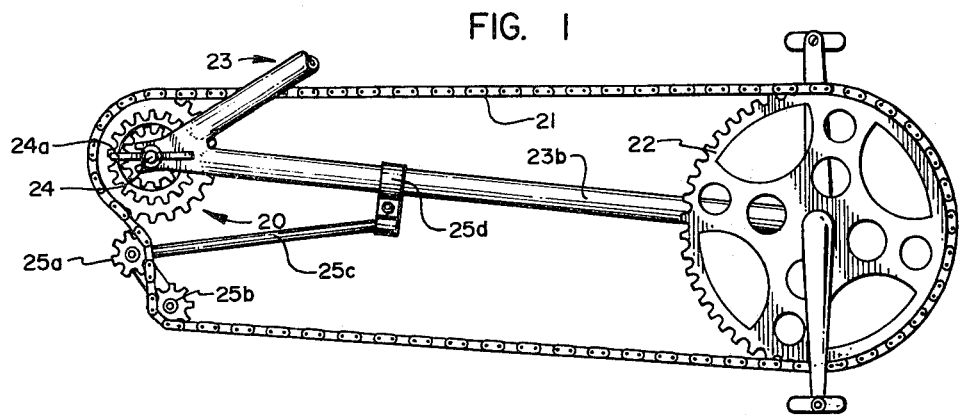
Figure 2:
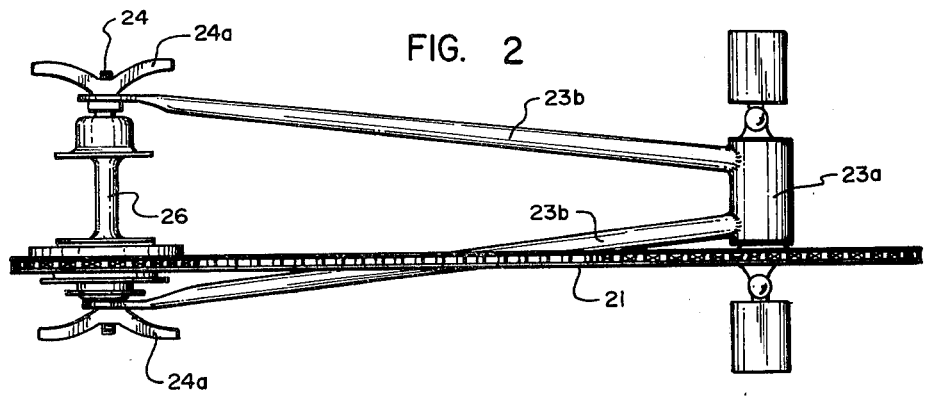

Referring now to the drawings:

In the illustrated preferred embodiment, the sprocket shift assembly is shown generally at 20, coupled by a chain 21 to a sprocket 22. A framework 23 includes a housing 23a, in which the support shaft (not shown) for the pedal operated driver sprocket 22 is journaled, and struts 23b that support an axle shaft 24. Quick release nuts 24a, threaded onto the shaft 24 securely clamp the axle in notches (not shown) of the struts 23b, in conventional fashion. Conventional, interconnected idler sprockets 25a and 25b, carried on the end of a flexible shaft 25c, the other end of which is attached at 25d to the strut 23b, help to maintain the chain 21 taut during sprocket shifting actions.

A hub 26 is journaled on the axle shaft 24 and, as is well known, the hub can be connected to a wheel or other such device and may be a driving member with respect to the sprocket cluster or may be driven through the sprocket cluster. Typically, in an arrangement as shown, the hub would form part of a wheel of a bicycle. In such an arrangement, a drum 27 (FIGS. 3 and 9) will normally fit over the hub and a conventional ratchet assembly 28 (FIG. 9) will allow the drum to rotate freely with respect to the hub in one direction of chain travel, while rotating with the hub in the opposite direction of chain travel. It will be apparent that the illustrated ratchet assembly coupling between the sprocket cluster, which is press fitted onto the drum, as will be hereafter described in detail, and the hub 26, while being a preferred coupling manner is only one of many that can be satisfactorily used.

Figure 3:
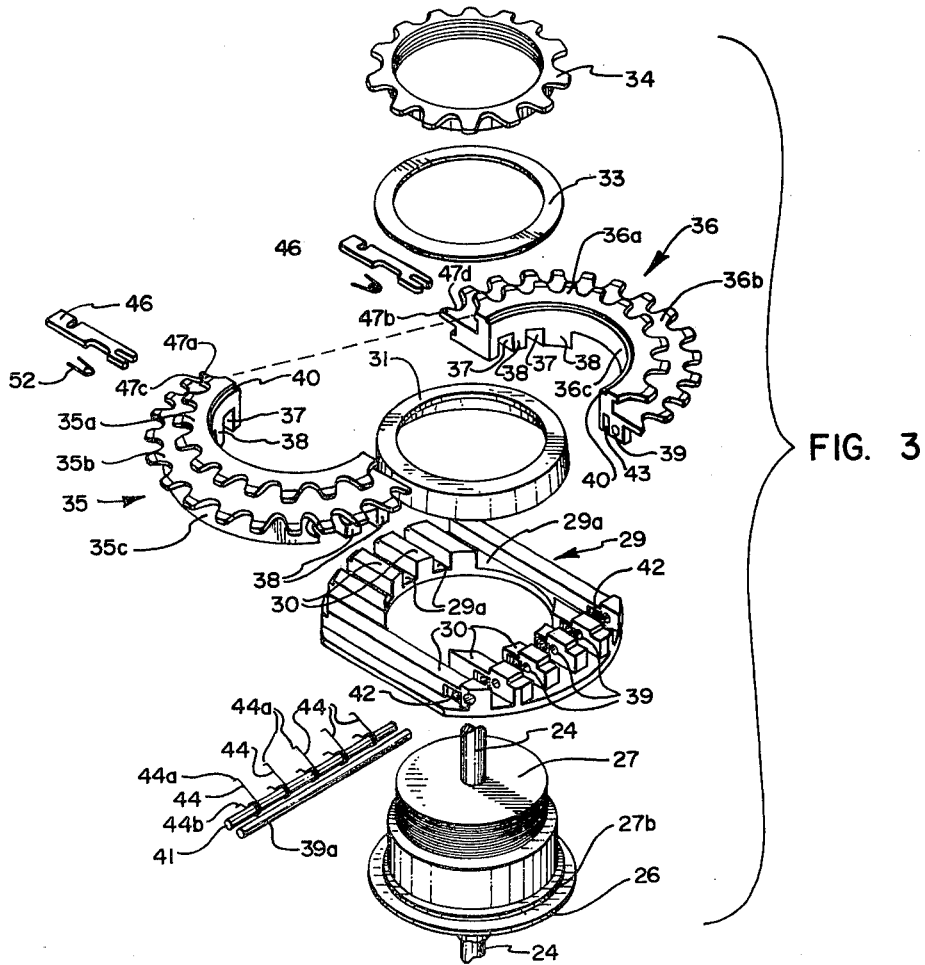
Figure 9:
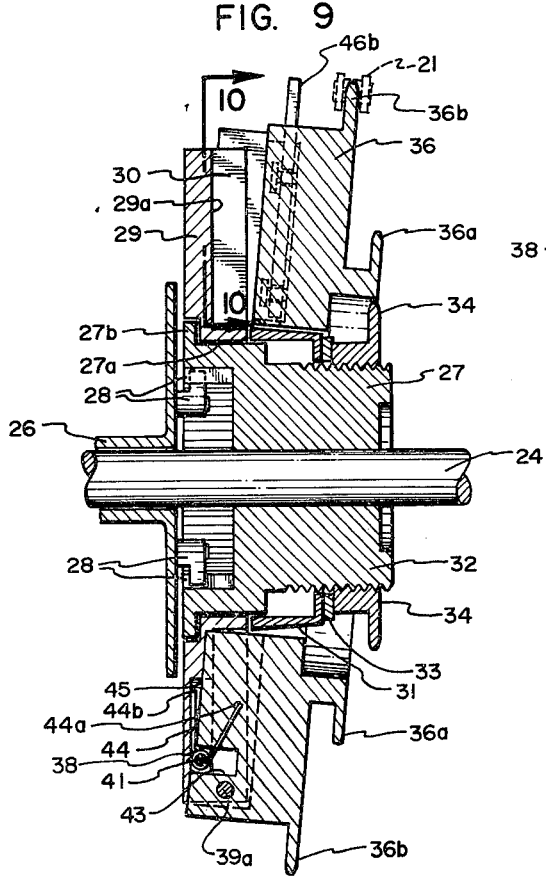
Figure 10:
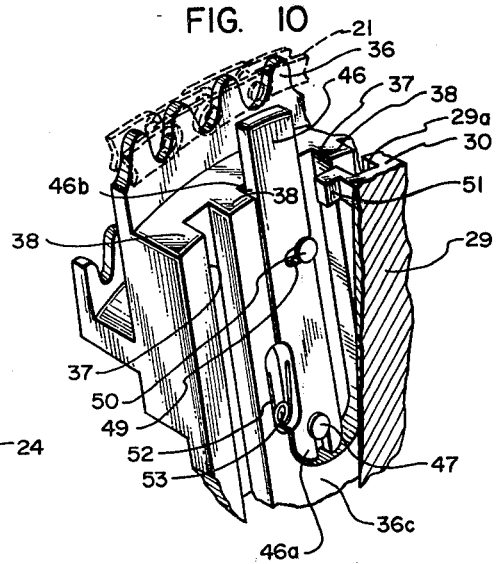

As shown best in FIGS. 3 and 9, a driving member, which may comprise driving hinge 29 is press fitted onto a shoulder 27a of a drum 27 and is tightly held against a flange 27b. The driving hinge 29 encircles the drum and has spaced parallel grooves 29a extending across the face thereof and lands 30 formed at the sides of the grooves.

As shown best in FIG. 9, a cup-shaped retainer 31 fits over a threaded projection 32 of drum 27 and bears against the driving hinge to hold the driving hinge against flange 27b. A washer 33 bears against the retainer 31, and a small sprocket 34 is threaded onto the projection 32 to secure the washer and retainer in place.

A pair of sprocket sectors 35 and 36, FIG. 3, each have a respective pair of partial sprockets 35a, 35b in a first plane, and 36a, 36b in a second plane, and the sprocket sectors 35 and 36 have backing members 35c and 36c, respectively. The backing members have spaced apart, parallel grooves 37 extending thereacross and lands 38 at opposite sides of the grooves. The sprockets 35a and 36a are of the same tooth radius and are smaller than the partial sprockets 35b and 36b, which also have the same tooth radius. When the sprocket sectors are abutted in end to end relationship, the partial sprockets 35a and 36a form a full sprocket in a first plane and the partial sprockets 35b and 36b form a full sprocket of larger diameter in a second plane while the smaller sprocket 34 lies in a third plane. The planes formed by the sprockets lie progressively outward from the hub 26.

The lands 38 of the partial sprockets are arranged to fit into the grooves 29a of the driving hinge 29. Aligned holes 39 are provided through the lands 30 and 38 of the driving hinge and the sprocket sectors, so that a pin 39a can be inserted therethrough at one end of the driving hinge. Sufficient clearance is provided between each of the lands 38 of the sprocket sectors and the lands 30 of the driving hinge to allow each of the sprocket sectors to pivot a limited amount with respect to the driving hinge, about the pin 39a.

A groove 40 is provided in each sprocket sector to extend around the inner circumference thereof and the groove is deep enough to allow teeth of the small sprocket 34 to be positioned in the groove and to then be in substantially the same plane as the teeth of the partial sprockets 35a or 36a, all as will be hereinafter described in greater detail.

The outer wall of the cup-shaped retainer 31 is flared slightly outwardly from the base that is threaded on the projection 32, so that the sprocket sectors will be able to pivot, as will be further described.

Another pin 41 extends through aligned holes 42 in the lands 30, and notches 43 are provided in the lands 38 to allow the lands 38 to straddle the pin 41 during pivoting of the sprocket sectors. Sear springs 44 are positioned in recesses 45 (FIG. 9) provided therefore in lands 30 of the driving hinge and are held in position by the pin 41, passing through the coiled portion of the spring 44. A hook 44a on one end of each sear spring is adapted to fit into a hole provided therefore in the land 30 of the driving hinge positioned next to its recess 45 when the driving hinge and sprocket sectors are assembled. The other end of each sear spring has a hook 44b that is anchored into a hole provided therefore in a land 38 of a sprocket sector. The springs 44 thus serve to resiliently bias the lands and grooves of the sprocket sectors into full inter-engagement with the lands and grooves of the driving hinge.

While not necessary for all purposes, it is frequently desirable that some means be provided for positively latching the free sides of the sprocket sectors, i.e., the sides opposite the pin 39, to the driving hinge, except during shifting operations, to be hereinafter explained. For this purpose, each sprocket sector has a latch lever 46 (FIGS. 3 and 19) attached thereto. The latch lever has a bifurcated end 46a that straddles a pin 47 projecting from the backing member 35c or 36c and a notch 49 adapted to fit over a pin 50, also projecting from the backing member. The latch lever pivots within a cutout portion 46b of the backing member and is biased by a sear spring 52 to a forward or latching position behind a finger 51 fixed to the driving hinge 29. The finger 51 fits between the latch and backing member when the latch is in the lock position.

Sear spring 52 has one end bearing against the backing member and its other end pushing against the latch lever 46. A pin 53 projecting from the backing member 35c or 36c extends through the coil of the spring to hold the spring in place. When a latch lever 46 is pivoted against the bias of its spring 52 it will clear the finger 51 and the lever, with the sprocket sector to which it is attached, can be moved against the bias of the spring 44 to pivot the sprocket sector about the pin 39. While only one latching mechanism has been described in detail, it should be apparent that the latching mechanism for locking each sprocket sector to the backing plate can be identical. It will thus be apparent that the latch levers 46 can be actuated manually to selectively pivot the sprocket sectors to position them for changing of the chain from one full sprocket to another full sprocket, with the determination as to whether the chain moves from a smaller to a larger sprocket or from a larger to a smaller sprocket being determined by whether the latch lever 46 of sprocket sector 35 or the latch lever 46 of sprocket 36, respectively, is actuated.

In practice, with the chain 21 entrained around sprocket 22 and the full sprocket formed by the aligned partial sprockets 35a and 36a, (FIG. 4), an intermediate drive ratio is established between the sprocket 22 and the sprocket shift assembly 20. When it is desired to change the drive ratio, one or the other of the sprocket sectors is pivoted with respect to pivot pin 39 so that the chain will move from a partial sprocket of one sprocket sector onto a partial sprocket of different radius on the other sprocket sector or onto a smaller full sprocket.

Figure 4:
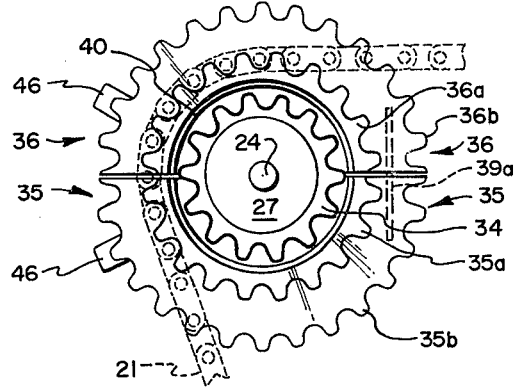
Figure 4A:
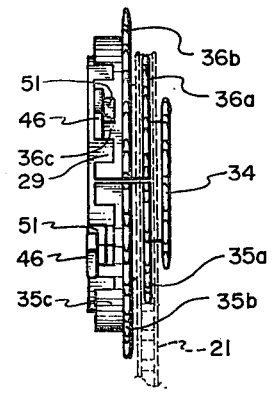
Figure 5:
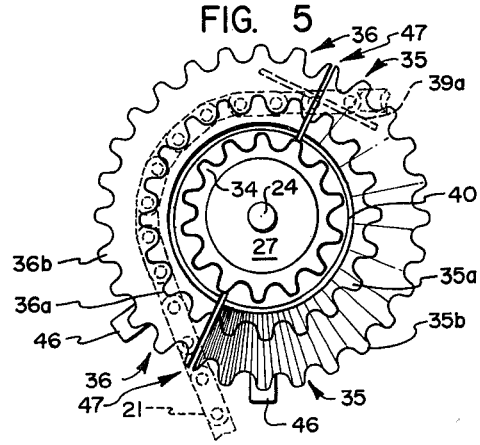
Figure 5A:
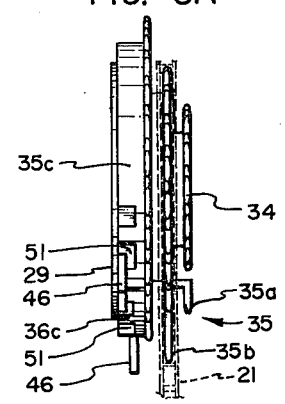

For example, as shown in FIGS. 4, 4a, 5, and 5a, if the chain 21 is to be moved from the intermediate full sprocket comprising partial sprockets 35a and 36a, FIG. 4, to the larger full sprocket comprising partial sprockets 35b and 36b, the latch lever 46 on the backing member of sprocket sector 35 is released. The lever 46 of the sprocket sector 35 and that sprocket sector are then pivoted about pivot pin 39. This moves the swinging portion of the sprocket sector 35 such that the teeth of the intermediate sprocket portion 35a thereon are in the plane of the teeth of the small sprocket 34 and the teeth of the larger sprocket portion 35b thereon are in the plane of the teeth of intermediate sprocket portion 36a, while the teeth of the larger sprocket portion 35b adjacent to the pivot pin 39 remain substantially in the plane of the teeth of the sprocket portion 36b. As shown best in FIGS. 5 and 5a, rotation of the sprockets in a clockwise direction will then move the chain from the intermediate sprocket portion 36a to the larger sprocket portion 35b and, as the sprockets continue to turn, chain 21 will be fully entrained in a generally helical pattern on to sprocket portion 35b. As the chain is fully entrained onto the sprocket portion 35b, and the lever 46 on the sprocket sector 36 is released, the spring 44 acting on the sprocket sector will bias it back into alignment with the sprocket sector 36 such that the sprocket portions 35a and 36a are in the same plane and sprocket portions 35b and 36b lie in the same plane. Thereafter the chain can travel around the larger full sprocket made by the aligned larger, partial sprockets 35b and 36b and the drive ratio is determined by the relative sizes of that larger full sprocket and sprocket 22.

Figure 6:
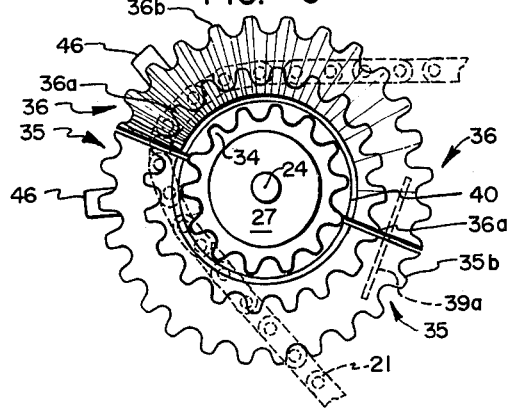
Figure 6A:
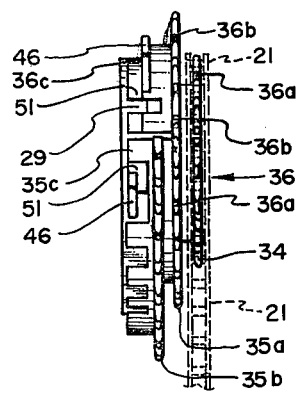

If the chain 21 is on the intermediate full sprocket comprising partial sprockets 35a and 36a, as shown in FIG. 4, and it is desired to shift it to the small full, non-segmented sprocket 34, the lever 46 of sprocket sector 36 is released to unlatch the sprocket sector. Thereafter, as shown in FIGS. 6 and 6a, as the chain 21 is entrained onto the sprocket portion 36a, pivoting of the sprocket sector 36 with respect to pivot pin 39 and against the bias of its spring 44, will reposition the teeth on the swinging portion of the sprocket portion 36a, such that the teeth of the small sprocket 34 are in the groove 40 and will be so aligned with the teeth of sprocket portion 36a that continued rotation of the sprockets will entrain the chain 21 in a generally helical fashion onto the teeth of the small sprocket 34. Upon release of the pivoted sprocket sector 36a, and after the chain has left the sprocket portion 36a, the sprocket sector 36 will be biased by its spring 44 back into complete inter-engaging relationship with the driving hinge 29, at which time sprocket portions 35a and 36a are aligned, sprocket portions 35b and 36b are aligned, and the chain is on sprocket 34.

Figure 7:
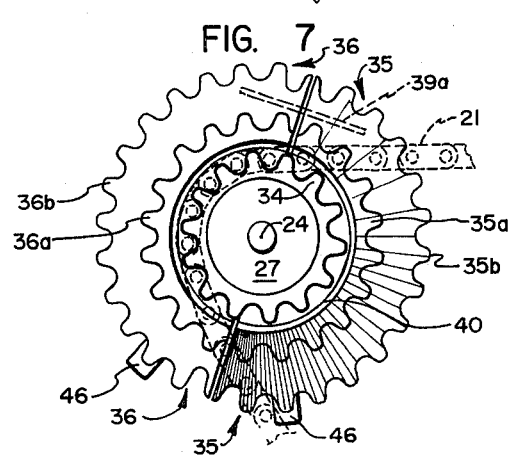
Figure 7A:
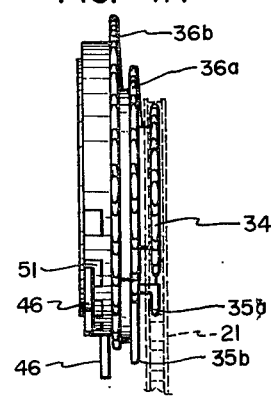

In FIGS. 7 and 7a, the relationship of the partial sprockets and sprocket sectors is shown as the chain 21 is moving from the small sprocket 34 to the intermediate full sprocket of the cluster of sprockets shown, and comprising the partial sprockets 35a and 36a. In accomplishing the shifting, the sprocket sector 35 is pivoted about the pivot pin in the manner previously described until teeth of the small sprocket are positioned in the groove 40 and teeth on the partial sprocket 35a are aligned with the teeth on the small sprocket 34. Rotation of the sprockets will then move the chain from the small sprocket to the partial sprocket 35a, and after the chain has left the small sprocket, the sprocket sector 35, with the chain 21 on partial sprocket 35a thereof, will be biased by its spring 44 into complete inter-engagement with the driving hinge 29.

Figure 8:
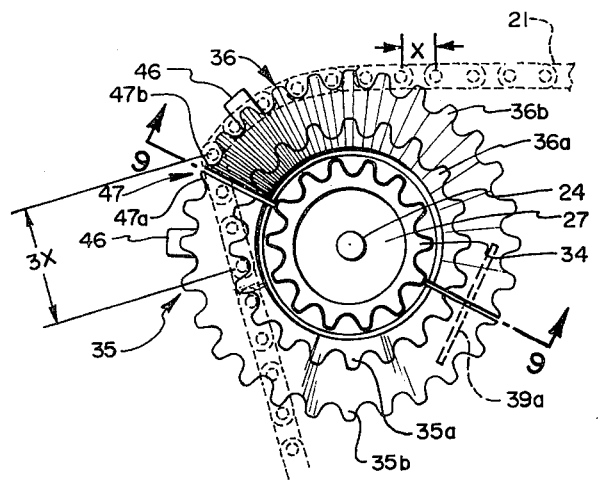
Figure 8A:
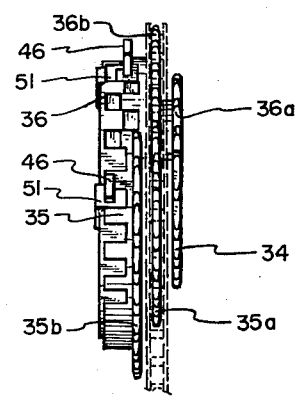

As shown in FIGS. 8 and 8a, the chain 21 is being shifted from the full larger sprocket (made up of aligned sprocket portion 35b and 36b) to the intermediate full sprocket (made up of aligned sprocket sections 35a and 36a) in the same manner as it is shifted from the intermediate full sprocket to the small sprocket 34, as has been heretofore described. That is, by releasing its latch 46 and pivoting the sprocket sector 36 against the bias of its spring 44 and holding the sprocket sector 36 in the pivoted position until the chain has transferred from the partial sprocket 36b to the partial sprocket 35a.

Each time the chain 21 is shifted it follows a generally helical pattern and it is fully in mesh with the receiving sprocket portion or sprocket before it fully leaves the sprocket or partial sprocket on which it was previously entrained.

It will be apparent that while the sprocket cluster illustrated is made up of a solid small sprocket, an intermediate full sprocket made up of aligned partial sprockets and a larger sprocket also made up of aligned partial sprockets, as many full sprockets made up of aligned partial sprockets carried by the sprocket sectors can be provided as may be desired. It is only necessary that the sprocket sector 35 be pivoted against the bias of its spring 44 to allow the chain to shift from one full sprocket to a larger full sprocket, and that the sprocket sector 36 be pivoted against the bias of its spring 44 to allow the chain to shift from one full sprocket to a smaller full sprocket.

It has been found that in order for the chain to follow the helical pattern during shifting, multiples of the pitch, or tooth spacing must be maintained. Some combinations of sprockets will provide such pitch multiples, as for example the illustrated small sprocket 34 with 14 teeth thereon, and the full intermediate sprocket made up of sprocket portions 35a and 35b, and having 20 teeth thereon. In other cases it is necessary that adjustments be made in the length of the discharging transfer tooth from which the chain is moved and the receiving transfer tooth on the sprocket or partial sprocket to which the chain is to be moved and/or in the depth of the gaps adjacent to the transfer teeth.

Thus, as shown, it may be necessary to make the common tooth of a full sprocket, formed by transfer teeth of sprocket portions, of a different length than the other teeth of the full sprocket and the gaps adjacent to the common tooth of different depth than the gaps adjacent to other teeth of the full sprocket. As seen best in FIGS. 3 and 8 for example, the common tooth 47 of the full sprocket made up by partial sprockets 35b and 36b, is formed by transfer teeth 47a and 47b of the respective partial sprockets, which are shorter than the other teeth of the partial sprockets and with gaps 47c adjacent to the transfer teeth that are deeper than the other gaps of the partial sprockets. The shorter common tooth and deeper gaps then results in pitch or tooth spacing between the common tooth 47 and a receiving tooth on a sprocket to which the chain is being transferred that is a multiple of the pitch of the chain 21. The chain 21 can thus be entrained from one pivoted discharge transfer tooth of one sprocket to a receiving transfer tooth of an adjacent sprocket of the sprocket shift assembly 20. As shown in FIG. 8, for example, the pitch or distance between tooth 47 and the receiving tooth of partial sprocket 35a is "3X" while the chain pitch is "X."

While a preferred embodiment of my invention has been herein disclosed, it is to be understood that such disclosure is by way of example and that variations are possible without departing from the subject matter coming within the scope of the following claims, which subject matter I regard as my invention.

I claim:
1. A sprocket shift assembly comprising
a driving hinge;
a pair of sprocket sectors, each having at least one partial sprocket thereon lying in a first plane;
another sprocket, lying in a second plane parallel to the first plane, and having a pitch diameter that is different from the pitch diameter of the full sprocket formed by the partial sprockets;
means mounting at least one of said sprocket sectors to be movable with respect to said driving hinge such that the partial sprockets of the sprocket sectors can lie in one plane at the same time to form a full sprocket when the sprocket sectors are in predetermined meshed position relative to the driving hinge, and such that each movable mounted sprocket sector can be moved to place some partial sprocket teeth thereof in a second plane; and
means coupling the sprocket sectors to the driving hinge for rotation therewith.

2. A sprocket shift assembly as in claim 1, further including
means for releasably locking each of the sprocket sectors movable with respect to the driving hinge to prevent undesired movement thereof.

3. A sprocket shift assembly as in claim 1, further including
means biasing each sprocket sector movable with respect to the driving hinge to thereby place the partial sprockets of the sprocket sectors in the same plane.

4. A sprocket shift assembly as in claim 3, further including
means for releasably locking each of the sprocket sectors movably mounted with respect to the driving hinge to prevent undesired movement thereof.

5. A sprocket shift assembly as in claim 4, wherein each sprocket sector movably mounted with respect to the driving hinge is pivotally connected thereto.

6. A sprocket shift assembly as in claim 2, wherein the means for releasably locking each of the movable sprocket sectors to the driving hinge comprises
a lever pivotally connected to each sprocket sector;
means biasing each lever to a locking position; and
latch means for each lever on the driving hinge, said latch means consisting of a finger projecting from the driving hinge such that the levers will be biased between the finger means and the driving hinge and will engage the finger means to prevent pivoting of the sprocket sectors with respect to said driving hinge.

7. A sprocket shift assembly as in claim 1, wherein the means for coupling the sprocket sectors to the driving hinge for rotation therewith includes
parallel grooves and lands on the driving hinge; and
parallel grooves and lands on the sprocket sectors, the lands of the sprocket sectors fitting in the grooves of the driving hinge and the lands of the driving hinge fitting in the grooves of the sprocket sectors.

8. A sprocket shift assembly as in claim 1, further including
a one-piece full sprocket, of smaller diameter than the full sprocket formed by the sprocket sectors, coaxially mounted with respect to the full sprocket formed by partial sprockets and in a plane parallel thereto whereby movement of a sprocket sector will position some of the teeth of a partial sprocket in the plane of the smaller one-piece full sprocket.

9. A sprocket shift assembly as in claim 5, wherein the means for releasably locking each sprocket sector pivotally connected to the driving hinge comprises
a lever pivotally connected to each sprocket sector;
means biasing each lever to a locking position; and
latch means for each lever on the driving hinge said latch means consisting of a finger projecting from the driving hinge such that the levers will be biased between the finger means and the driving hinge and will engage the finger to prevent movement of the sprocket sectors with respect to said driving hinge.

10. A sprocket shift assembly as in claim 9, wherein the means for coupling the sprocket sectors to the driving hinge for rotation therewith includes
parallel grooves and lands on the driving hinge; and parallel grooves and lands on the sprocket sectors, the lands of the sprocket sectors fitting in the grooves of the driving hinge and the lands of the driving hinge fitting in the grooves of the sprocket sectors.

11. A sprocket shift assembly as in claim 10, further including
a one-piece full sprocket, of smaller diameter than the full sprocket formed by the sprocket sectors, coaxially mounted with respect to the full sprocket formed by partial sprockets and in a plane parallel thereto whereby pivoting of a sprocket sector will position some of the teeth of a partial sprocket in the plane of the smaller one-piece full sprocket.

12. A sprocket shift assembly as in claim 11, further including
a hub comprising a member to be rotated; and
means coupling the driving hinge to the hub for rotation therewith.

13. A sprocket shift assembly as in claim 12, wherein the means coupling the driving hinge to the hub for rotation therewith comprises
a ratchet assembly that locks the driving hinge to the hub for rotation in one direction and that allows independent reverse rotation of the hub and driving hinge.

14. A sprocket shift assembly as in claim 1, further including means for providing a tooth spacing between each movable sprocket sector and the other sprocket lying in a second plane parallel to the first plane and having a pitch diameter that is different from the pitch diameter of the full sprocket formed by the partial sprockets, that is a multiple of the chain pitch.

15. A sprocket shift assembly as in claim 14, wherein the means for providing a tooth spacing between each movable sprocket sector and the other sprocket that is a multiple of the chain pitch comprises
a partial tooth on a movable sprocket sector that is of different length than the other teeth of said sprocket; and
gaps adjacent to said partial tooth having a different depth than gaps adjacent to others of the teeth on said sprocket.

16. A sprocket shift assembly comprising
a driving hinge;
a pair of sprocket sectors, each having at least two partial sprockets thereon, one of said partial sprockets having a larger radius than the other and said partial sprockets lying in parallel first and second planes; and
means coupling at least one of said sprocket sectors to said driving hinge such that the smaller partial sprockets of the sprocket sectors can lie in one plane at the same time the larger partial sprockets of the sprocket sectors are in another plane to respectively form smaller and larger full sprockets and such that the same one sprocket sector can be moved to place some teeth of one partial sprocket of one radius in the plane of a partial sprocket of different radius of the other sprocket sector.

17. A sprocket shift assembly as in claim 16, wherein the means coupling at least one of said sprocket sectors to said driving hinge includes a pivot connection.

18. A sprocket shift assembly as in claim 16, wherein both sprocket sectors are pivotally connected to the driving hinge.

19. A sprocket shift assembly as in claim 18, further including
means for releasably locking each of the sprocket sectors movable with respect to the driving hinge to prevent undesired movement thereof.

20. A sprocket shift assembly as in claim 19, wherein the means for coupling the sprocket sectors to the driving hinge for rotation therewith includes
parallel grooves and lands on the driving hinge; and
parallel grooves and lands on the sprocket sectors, the lands of the sprocket sectors fitting in the grooves of the driving hinge and the lands of the driving hinge fitting in the grooves of the sprocket sectors.

21. A sprocket shift assembly as in claim 20, wherein the means for releasably locking the sprocket sectors to the driving hinge comprises
a lever pivotally connected to each sprocket sector;
means biasing each lever to a locking position; and
latch means for each lever on the driving hinge, said latch means consisting of a finger projecting from the driving hinge such that the levers will be biased between the finger means and the driving hinge and will engage the finger to prevent pivoting of the sprocket sectors with respect to said driving hinge.

22. A sprocket shift assembly as in claim 21, further including
means for providing a tooth spacing between each movable sprocket sector and a partial sprocket on the other sprocket sector that is a multiple of the chain pitch.

23. A sprocket shift assembly as in claim 22, wherein the means for providing a tooth spacing between each movable sprocket sector and the other sprocket that is a multiple of the chain pitch comprises
a partial tooth on a movable sprocket sector that is of different length than the other teeth of said sprocket; and
gaps adjacent to said partial tooth having a different depth than gaps adjacent to others of the teeth on said sprocket.

24. A sprocket shift assembly comprising
a driving hinge;
a pair of sprocket sectors, each having at least one partial sprocket thereon; and
means mounting at least one of said sprocket sectors to be movable with respect to said driving hinge such that the partial sprockets of the sprocket sectors can lie in one plane at the same time to form a full sprocket, and such that at least one sprocket sector movably mounted with respect to said driving hinge can be moved to place some partial sprocket teeth thereof in a second plane.

25. A sprocket shift assembly as in claim 24, including
another sprocket having a tooth pitch that is different from the tooth pitch of the full sprocket formed by the partial sprockets;
means mounting said other sprocket such that the teeth thereof can lie substantially in the second plane.

26. A sprocket shift assembly as in claim 24, further including
means for releasably locking each of the sprocket sectors, movable with respect to the driving hinge, to the said hinge to prevent undesired movement thereof.

27. A sprocket shift assembly as in claim 24, further including
means coupling the sprocket sectors to the driving hinge for rotation therewith.

28. A sprocket shift assembly as in claim 27, wherein the partial sprockets lie in one plane to form a full sprocket when the sprocket sectors are fully meshed with the driving hinge.

29. A sprocket shift assembly as in claim 27, including another sprocket having a pitch diameter that is different from the pitch diameter of the full sprocket formed by the partial sprockets;
means mounting said other sprocket such that the teeth thereof can lie substantially in the second plane.

30. A sprocket shift assembly as in claim 27, further including
means for releasably locking each of the sprocket sectors, movable with respect to the driving hinge, to the said hinge to prevent undesired movement thereof.

* * * * *